United States Patent Office 3,169,821
Patented Feb. 16, 1965

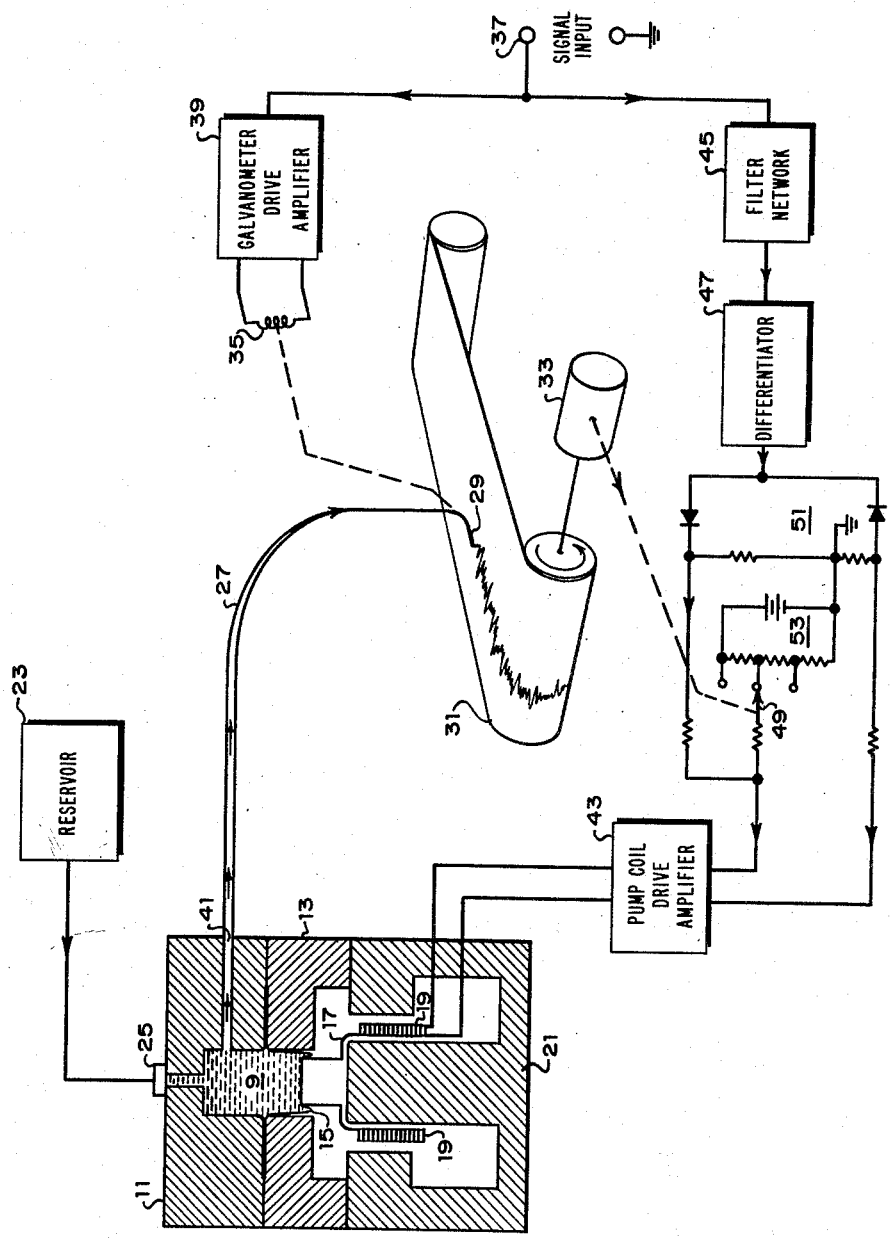

3,169,821
FLUID PRESSURE CONTROLLER
Arthur Miller, Brookline, Mass., assignor to Hewlett-Packard Company, Palo Alto, Calif., a California corporation
Filed Nov. 20, 1963, Ser. No. 325,057
4 Claims. (Cl. 346—140)

This invention relates to fluid pressure apparatus and more particularly to a hydrodynamic inking system for graphic recorders and the like.

Certain known graphic recorders use inking systems which depend upon gravity feed or capillary action to supply ink from a reservoir to the pen tip. The disadvantages of these schemes are that the flow of ink suitable for a pen traveling at low speeds is insufficient to produce an ink trace when the pen is traveling at high speeds. Also these systems have the disadvantage that the ink reservoir when mounted on the pen for proper feed increases the inertia of the pen. This in turn decreases the rate at which the velocity of the pen can change in response to an applied force.

Some of these disadvantages have been overcome in the past using viscous ink under static pressure. A system of this type required the pen tip to be spring biased against the paper or other surface in order to prevent the ink under pressure from escaping through the pen-paper junction. This causes excessive wear of the pen tip and requires greater force exerted on the pen to overcome pen friction and to effect motion in response to an applied signal to be recorded.

Accordingly, it is an object of the present invention to provide a hydrodynamic inking system for a graphic recorder which supplies ink to the pen tip at a flow rate which is related to the relative velocity of the pen tip with respect to the paper or other surface to be inked.

It is another object of the present invention to provide apparatus for supplying ink to the pen of a graphic recorder with a pressure which is related to the velocity of the pen tip with respect to the surface to be inked.

It is still another object of the present invention to provide improved fluid pressure apparatus.

In accordance with the illustrated embodiment of the present invention a chamber enclosing a supply of ink is provided with a plunger in one wall. The plunger is arranged to vary the volume of the chamber and includes an electromagnetic coil disposed within a magnetic field. An electrical signal having an amplitude related to the electrical signal applied to the pen-positioning apparatus of a graphic recorder is applied to the coil disposed on the plunger. The plunger is actuated in response to this electrical signal, thereby varying the pressure on the ink. The ink under pressure flows from the chamber enclosing the supply of ink through a flexible, indistensible tube to the pen tip. Increased relative motion of the pen with respect to the surface to be inked due, for example, to an increase in the signal applied to the graphic recorder is thus accompanied by an increase in the flow of ink to the pen tip.

Other and incidental objects of the present invention will be apparent from a reading of this specification and an inspection of the accompanying drawing which shows a pictorial diagram of the ink pressurizing apparatus of the present invention.

Referring now to the drawing, there is shown a supply of ink 9 having low viscosity enclosed within a chamber formed by sections 11 and 13 and by the flexible member 15 clamped therebetween. The flexible member 15 is actuated by plunger 17 which includes an electromagnetic coil 19 disposed within the magnetic field provided by permanent magnet 21. This supply of ink 9 may be replenished manually from time to time or automatically from reservoir 23 through a suitable valve 25. The ink within the chamber flows through a flexible, indistensible tube 27 to the tip of pen 29 mounted on the moving coil of galvanometer 35. This galvanometer is driven by amplifier 39 in response to the signal appearing at input terminal 37. At the same time, current is supplied to coil 19 on plunger 17 which is related to the current in the coil of the galvanometer 35. If the motion of the plunger is small then substantially all of the force produced by the current in coil 19 within the magnetic field of magnet 21 produces pressure on the ink 9. The hydraulic resistance at the outlet port 41 of the ink chamber is a constant value determined substantially by the ink passage in the pen and in connecting tubing 27 and not by the pen-paper junction. This is because the ink 9 of low viscosity flows easily from the tip of pen 29 if the pen is moving and is lightly biased against the paper 31. The flow of ink from the tip of pen 29 is thus closely related to the current supplied to coil 19. This current is derived from differential amplifier 43 which receives a signal from the input terminal 37 through filter network 45, differentiator 47 and the full-wave rectifying circuit 51 including switch 49 which is linked with the chart-speed controlling motor 33. This link may extend to a switch or other device which is used to select the chart speed so that as the chart speed is varied, the setting of the movable contact on switch 49 of network 53 is also varied. This provides an output voltage from network 53 which is thus proportional to chart speed. The filter network 45 is designed to simulate electrically the inertial movement and dynamic characteristics of the galvonometer 35. The output signal from filter network 45 for an applied signal at terminal 37 is thus proportional to the pen movement. The voltage source and divider circuit 53 supplies a static signal related to the chart speed. The amplifier 43 thus supplies a unidirectional current to coil 19 which is proportional to the sum of the absolute value (i.e. without regard for polarity) of rate of change of input voltage and a voltage proportional to the paper speed. Any slight lag between the current supplied to coil 19 and the resulting change in ink flow, for example, to the compressibility of the ink and to departure from the ideal indistensibility of tubing 27 may be compensated for in filter network 45 wherein slightly less lag than is represented by the galvanometer motion to applied signal may be provided. Where a servo-mechanism is used to position the pen 29, the position or velocity information thus provided may be used directly to control the current in coil 19, thereby obviating the need for filter network 45. The flow rate of ink from pen 29 may also be varied in response to pen velocity by maintaining constant pressure on the ink and by regulating ink flow to the pen in response to a control signal produced in a manner as described above.

Therefore the inking system of the present invention provides a flow of ink at the pen tip of a graphic recorder which is proportional to the relative velocity of the pen with respect to the recording chart. This aids in maintaining a uniform line width despite the speed at which the recorder is operated and also eliminates the formation of ink blots while the pen is at rest. Further, the system is self-priming and therefore obviates the need for wetting the capillary tube of conventional inking systems and for establishing proper spring bias between the pen tip and the surface to be inked prior to establishing pressure in viscous ink systems.

I claim:
1. A dynamic ink system for supplying ink to the writing pen of a graphic recorder at a flow rate related to the writing rate of said pen, said ink system comprising:
- a chamber enclosing a supply of ink in contact with all inner surfaces of said chamber;
- a plunger disposed in a wall of said chamber for altering the volume thereof, said plunger including an electric coil disposed in a magnetic field;
- a writing pen disposed in contact with the surface of a record chart of the graphic recorder;
- a tube connecting said chamber to said pen for supplying ink thereto;
- input terminals for receiving an input signal to be recorded;
- means connected to said input terminals for moving said pen at a velocity related to the signal appearing on said input terminals;
- electrical means connected to the coil of said plunger and connected to said input terminals for applying a signal to said coil related to the velocity of said pen for decreasing the volume of said chamber to exert increasing force upon the ink within the chamber in response to increasing magnitude of the writing rate of said pen.

2. Ink system for a graphic recorder and the like, said system comprising:
- an input for receiving a signal to be recorded;
- a pen disposed in contact with a recording chart of said graphic recorder;
- means connecting said pen to said input for moving said pen with respect to the chart to produce relative motion between said pen and said chart which is related to signal to be recorded appearing at said input;
- a chamber for enclosing a supply of ink having inner surfaces all in contact with said ink and including a movable wall therein for altering the volume of said chamber;
- a plunger including a coil disposed in a magnetic field and connected to receive an electrical signal for actuating said movable wall to decrease the volume of said chamber and increase the ink pressure therewithin in response to electrical signal applied to said coil;
- a tube connecting said chamber and said pen; and
- a network connected to said input and to said coil for applying a signal thereto having an absolute value related to the motion of said pen with respect to said chart.

3. A dynamic ink system for supplying ink to the writing pen of a graphic recorder at a flow rate related to the writing rate of said pen, said ink system comprising:
- a chamber enclosing a supply of ink in contact with all inner surfaces of said chamber;
- a plunger disposed in a wall of said chamber for altering the volume thereof, said plunger including an electric coil disposed in a magnetic field;
- a writing pen disposed near the surface of a record chart of the graphic recorder;
- means coupled to said record chart for moving the same at a selected speed;
- a tube connecting said chamber to said pen for supplying ink thereto;
- an input for receiving a signal to be recorded;
- means connected to said pen for moving said pen at a velocity which is related to a signal to be recorded appearing at said input to produce relative motion between said record chart and said pen at a writing rate for said pen which is related to the sum of the velocity of the record chart and the velocity of the pen;
- circuit means connected to said means for moving the chart and to the input for producing a control signal related to the combined velocities of the pen and the chart; and
- electrical means connected to the coil of said plunger and to said circuit means for applying said control signal to said coil to decrease the volume of said chamber to exert increasing force upon the ink within the chamber in response to increasing magnitude of the writing rate of said pen.

4. A dynamic ink system for supplying ink to the writing pen of a graphic recorder at a flow rate related to the writing rate of said pen, said ink system comprising:
- a chamber enclosing a supply of ink in contact with all inner surfaces of said chamber;
- a plunger disposed in a wall of said chamber for altering the volume thereof, said plunger including an electric coil disposed in a magnetic field;
- a writing pen disposed near the surface of a record chart of the graphic recorder;
- a tube connecting said chamber to said pen for supplying ink thereto;
- an input for receiving a signal to be recorded;
- means connected to said pen for moving said pen at a velocity which is related to a signal to be recorded appearing at said input to produce relative motion between said record chart and said pen at a writing rate for said pen which is related to the sum of the velocity of the record chart and the velocity of the pen;
- a first circuit for producing a first voltage related to the velocity of said record chart;
- a second circuit for producing a second voltage related to the rate of change of signal appearing at said input terminals; and
- means connected to said coil for applying thereto a signal related to the combination of the absolute magnitudes of the first and second voltages for decreasing the volume of said chamber to exert increasing force upon the ink within the chamber in response to increasing magnitude of the writing rate of said pen.

References Cited by the Examiner

UNITED STATES PATENTS

| | | | |
|---|---|---|---|
| 3,054,109 | 9/62 | Brown | 346—140 X |
| 3,116,964 | 1/64 | Zenner | 346—140 |

FOREIGN PATENTS

| | | |
|---|---|---|
| 753,407 | 8/33 | France. |
| 554,308 | 6/43 | Great Britain. |
| 919,484 | 2/63 | Great Britain. |

LEYLAND M. MARTIN, *Primary Examiner.*

LEO SMILOW, *Examiner.*